United States Patent
Lin

(10) Patent No.: US 8,209,487 B2
(45) Date of Patent: Jun. 26, 2012

(54) BLOCK UPDATE FOR FLASH MEMORY UTILIZING A CACHE PAGE AND CACHE BLOCK

(75) Inventor: Tsai-Cheng Lin, Hsinchu (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 488 days.

(21) Appl. No.: 12/481,800

(22) Filed: Jun. 10, 2009

(65) Prior Publication Data

US 2010/0100665 A1 Apr. 22, 2010

Related U.S. Application Data

(60) Provisional application No. 61/105,900, filed on Oct. 16, 2008.

(51) Int. Cl.
*G06F 12/00* (2006.01)

(52) U.S. Cl. ........ 711/118; 711/103; 711/156; 711/165; 365/185.33

(58) Field of Classification Search .................. 711/103, 711/118, 156, 165; 365/185.33
See application file for complete search history.

(56) References Cited

U.S. PATENT DOCUMENTS

| | | | |
|---|---|---|---|
| 6,928,521 B1 * | 8/2005 | Burton et al. | 711/144 |
| 7,526,599 B2 * | 4/2009 | Chang et al. | 711/103 |
| 7,872,922 B2 * | 1/2011 | Suda | 365/185.33 |
| 7,975,109 B2 * | 7/2011 | McWilliams et al. | 711/147 |
| 2006/0218347 A1 * | 9/2006 | Oshima | 711/115 |
| 2008/0209109 A1 * | 8/2008 | Lasser | 711/103 |
| 2008/0294837 A1 * | 11/2008 | Suda | 711/103 |

* cited by examiner

*Primary Examiner* — Stephen Elmore

(74) *Attorney, Agent, or Firm* — Thomas|Kayden

(57) ABSTRACT

The invention discloses a flash memory apparatus, including a plurality of blocks and a memory controller. The blocks include a first block, wherein the first block includes a first page. The memory controller receives a first data to be written into the first page of the first block. When the first page has already been written to, the memory controller further selects one of the blocks as a first cache block, writes the first data into a first cache page of the first cache block and records the number of the first block and the number of the first page into the first cache page. The memory controller further updates the first block according to the number of the first block and the number of the first page recorded in the first cache page when receiving an update command.

14 Claims, 6 Drawing Sheets

BLOCK UPDATE FOR FLASH MEMORY UTILIZING A CACHE PAGE AND CACHE BLOCK

This Application claims benefit of U.S. Provisional Patent Application No. 61/105,900, filed on Oct. 16, 2008, the entirety of which is incorporated by reference herein.

BACKGROUND OF THE INVENTION

1. Field of the Invention

The invention relates generally to a data update method and a flash memory apparatus using the method, and more particularly, to a data update method that improves the data update efficiency for a flash memory apparatus.

2. Description of the Related Art

A flash memory apparatus typically comprises a memory controller and a plurality of blocks for storing data, each block comprises a plurality of pages. When a specific page of a block of a flash memory apparatus is to be updated, it's first determined whether the page has already been written to. If not, the page is directly written (updated) with the new data. If so, the page can not be overwritten. Therefore, a new blank block is utilized for data update procedure.

For example, referring to FIG. 1 where an external computer 10 and a flash memory apparatus 11 are shown. The flash memory apparatus 11 comprises a memory controller 12 for data retrieving and writing. In FIG. 1, the external computer 10 provides a data X to be written into the flash memory apparatus 11. Assume that the data X is to be written into a page 1 of a block b13 of the flash memory apparatus 11. In this case, the memory controller 12 can directly write the data X into the page 1 since the page 1 is blank (writable). However, if the data X is to be written into a page 2 of the block b13 of the flash memory apparatus 11, the memory controller 12 can't write the data X on it since the page 2 has already been written to. Therefore, a blank block b14 is required. With the blank block b14, the memory controller 12 transfers the data from all pages other than the page 2 of the block b13 to the corresponding pages of the blank block b14, and writes the data X into the page 2 of the blank block b14, thereby updating the page 2 of the block b13. After the block b13 is updated, the original block b13 is completely erased as a new blank block for future use.

The above data update mechanism is based on Mother/Child relationship between blocks, with the original block b13 that is to be updated as a mother block and the new blank block b14 used for the update procedure as a child block. However, the number of the blocks of a flash memory apparatus is limited. Therefore, the above data update mechanism is inefficient and costly if there are too many blocks that require updating (since more blank blocks are required for data update procedures).

BRIEF SUMMARY OF THE INVENTION

In light of the problem, an efficient data update method for a flash memory apparatus is required.

The invention discloses a flash memory apparatus, comprising a plurality of blocks and a memory controller. The blocks comprise a first block, wherein the first block comprises a first page. The memory controller receives a first data to be written into the first page of the first block. When the first page has already been written to, the memory controller further selects one of the blocks as a first cache block, writes the first data into a first cache page of the first cache block and records the number of the first block and the number of the first page into the first cache page. The memory controller further updates the first block according to the number of the first block and the number of the first page recorded in the first cache page when receiving an update command.

The invention further discloses a data update method for a flash memory apparatus comprising a plurality of blocks comprising a first block, wherein the first block comprises a first page. The method comprises receiving a first data to be written into the first page of the first block, writing the first data into a first cache page of a first cache block when the first page has already been written to, recording the number of the first block and the number of the first page into the first cache page, and updating the first block according to the number of the first block and the number of the first page recorded in the first cache page when receiving an update command.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
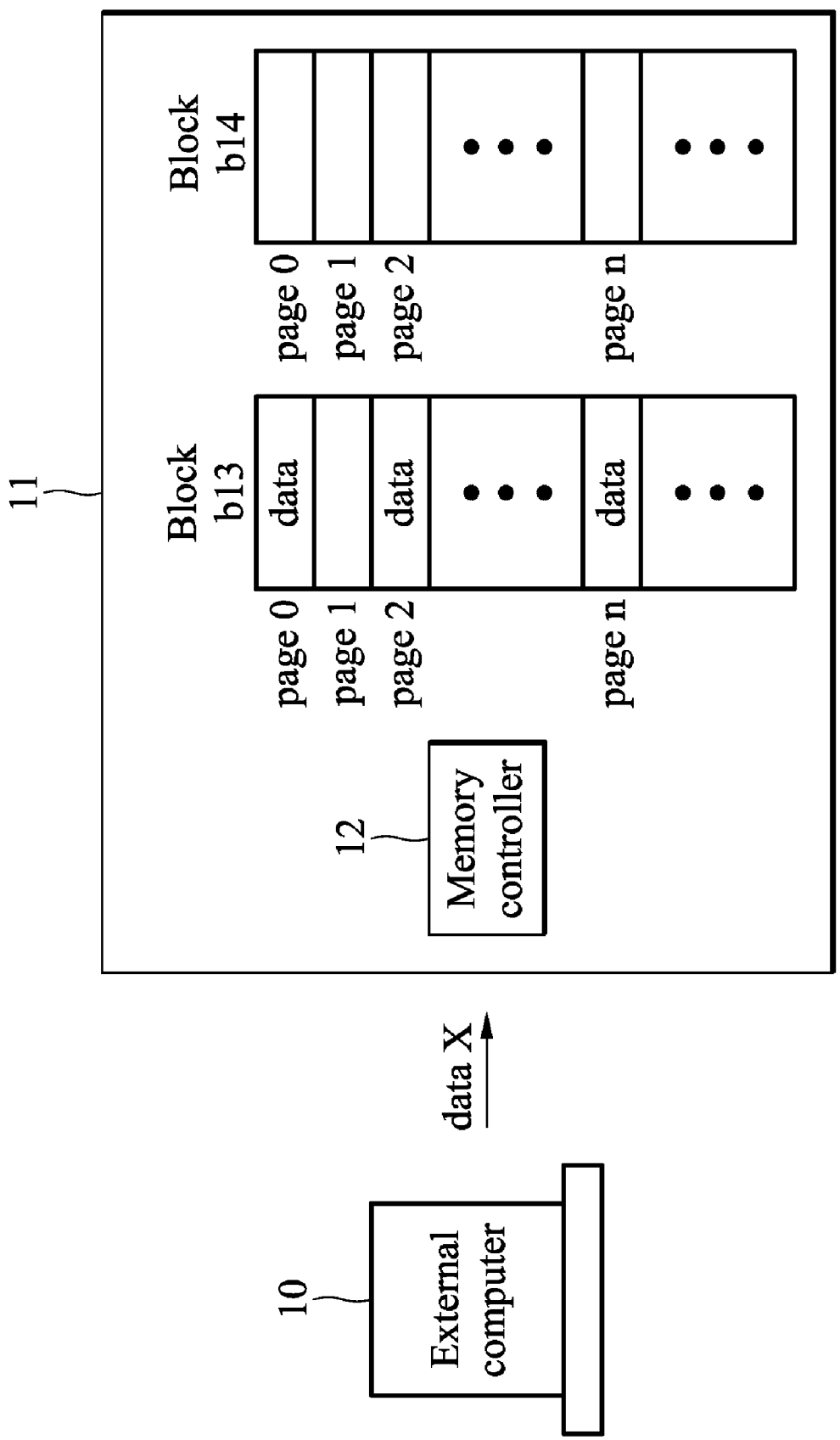
FIG. 1 shows an external computer and a flash memory apparatus.
Figure 2:
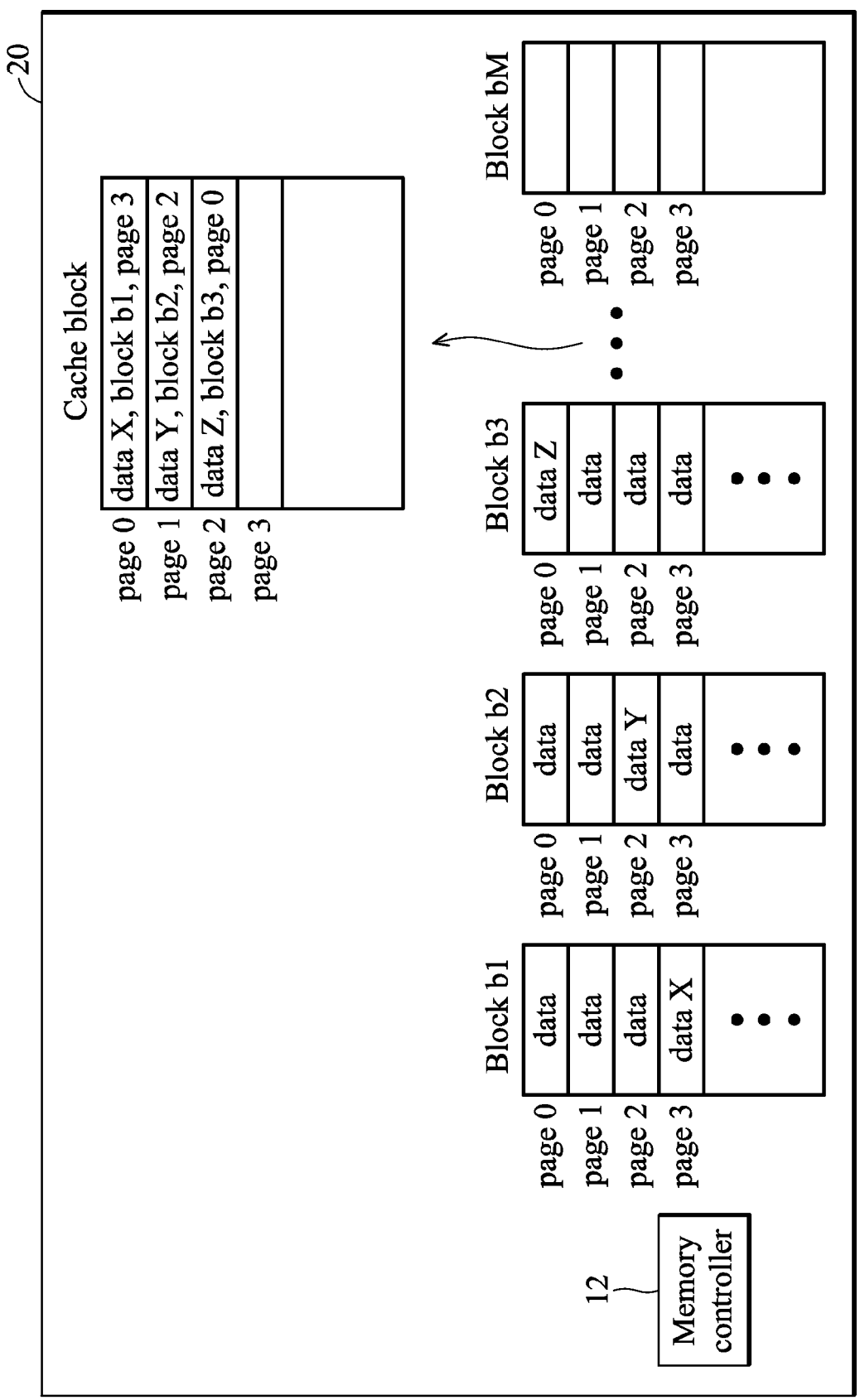
FIG. 2 shows a diagram of a flash memory apparatus according to an embodiment of the invention.

FIG. 2 shows a diagram of a flash memory apparatus according to an embodiment of the invention. The flash memory apparatus 20 comprises a memory controller 12 and M blocks numbered as b1, b2, b3, . . . , b(M-1) and bM. Each block has a plurality of pages respectively numbered as 0, 1, 2 . . . etc. Assume that the memory controller 12 receives the data X, Y and Z from the external computer 10 to be respectively written into the page 3 of block b1, the page 2 of block b2 and the page 0 of block b3. In this case, the memory controller 12 can't write the data X, Y and Z on these pages if the three pages have already been written. Therefore, the memory controller 12 selects a blank block from the M blocks as a cache block. The cache block also has a plurality of pages numbered as 0, 1, 2, 3 . . . etc, as shown in FIG. 2.

Next, the memory controller 12 writes the data X that is originally to be written into the page 3 of block b1 into the page 0 of the cache block, and records the number of the page and the number of the block that the data X is originally directed to into a spare area of the page 0 of the cache block, i.e. the message "block b1, page 3". Next, the memory controller 12 writes the data Y that is originally to be written into the page 2 of block b2 into the next page of the cache block (i.e. page 1), and records the number of the page and the number of the block that the data Y is originally directed to into a spare area of the page 1 of the cache block, i.e. the message "block b2, page 2". Similarly, the memory controller 12 writes the data Z that is originally to be written into the page 0 of block b3 into the next page of the cache block (page 2), and records the number of the page and the number of the block that the data Z is originally directed to into a spare area of the page 2 of the cache block, i.e. the message "block b3, page 0".

In the above embodiment, for three data X, Y and Z to be written into different blocks, the invention only uses a blank block as a cache block for data update procedure, unlike the traditional mechanism requiring 3 blank blocks. With the data stored in the cache block, the data update of the blocks b1, b2 and b3 can be performed anytime. The data update of the blocks b1, b2 and b3 may be triggered by a user making an update command through an Operation System (OS). In response to the update command, the memory controller 12 updates the blocks b1, b2 and b3 according to the data X, Y and Z stored in the cache block, as well as the related messages recorded in the spare areas of the cache block. Specifically, based on the data X stored in the page 0 of the cache block and the message "block b1, page 3" recorded in the spare area of the page 0 of the cache block, the memory controller 12 is able to realize that the data X is to be written to the page 3 of the block b1. Therefore, the memory controller 12 copies the data X stored in the cache block to a page 3 of a blank block and transfers the data from all pages other than page 3 of the block b1 to the corresponding pages of the blank block, thereby updating the page 3 of the block b1. After the block b1 is updated, the block b1 is erased and released as a new blank block. Similarly, the update of blocks b2 and b3 are in the same procedure, it's not described again for brevity.

Figure 3:
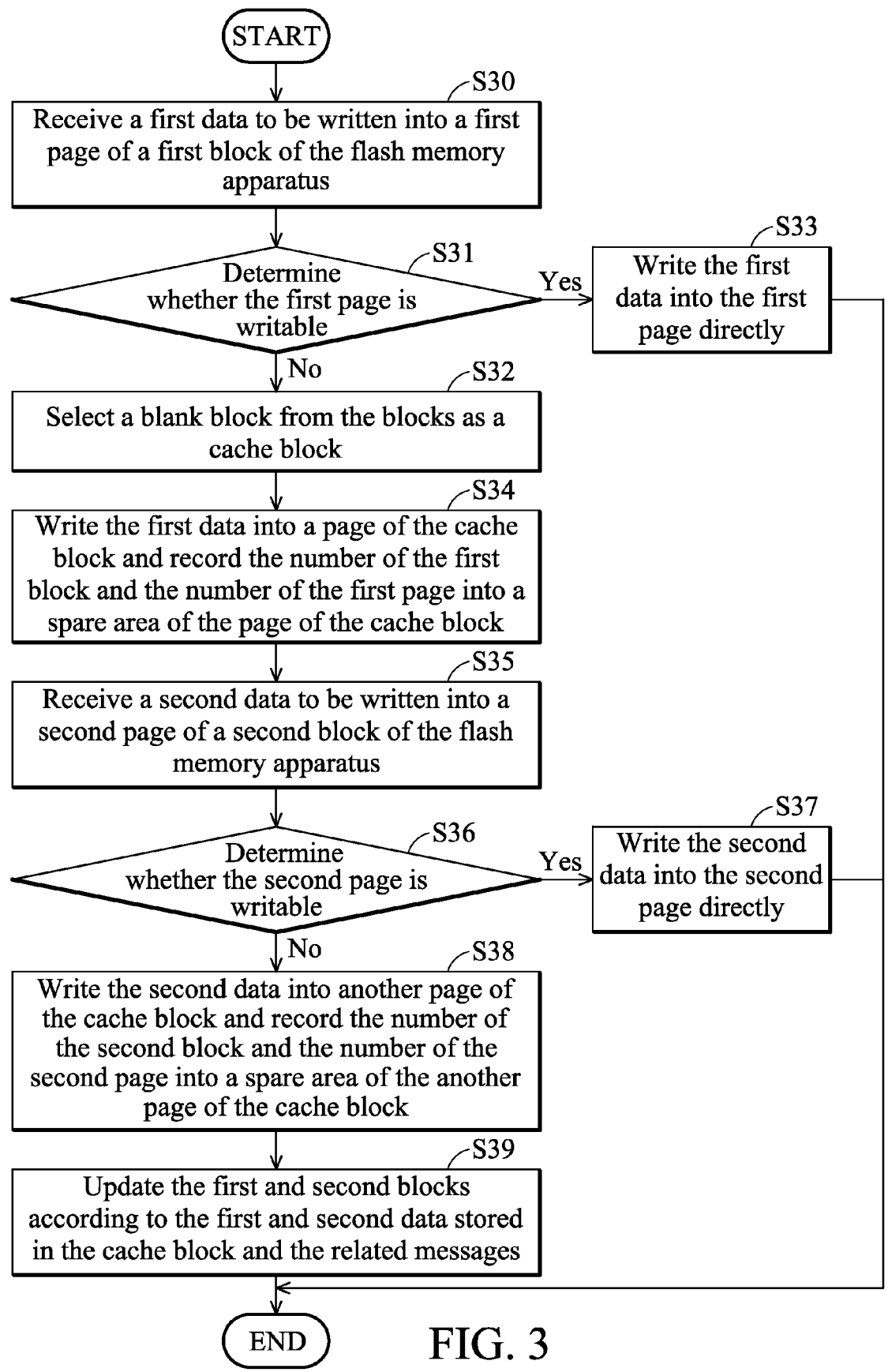
FIG. 3 shows a flowchart for data updating for a flash memory apparatus according to an embodiment of the invention.

FIG. 3 shows a flowchart for data update procedure for a flash memory apparatus according to an embodiment of the invention. The flash memory apparatus comprises a plurality of blocks, each comprising a plurality of pages. At the beginning, a first data to be written into a first page of a first block of the flash memory apparatus is received (step S30). Next, it is determined whether the first page is writable (step S31). If not, a blank block is selected from the blocks as a cache block (step S32). If so, the first data is directly written into the first page (step S33). Following the step S32, the first data is written into a page of the cache block, and the number of the first block and the number of the first page are recorded into a spare area of the page of the cache block (step S34). Next, a second data to be written into a second page of a second block of the flash memory apparatus is received (step S35). Next, it is determined whether the second page is writable (step S36). If so, the second data is directly written into the second page (step S37). If not, the second data is written into another page of the cache block, and the number of the second block and the number of the second page are recorded into a spare area of the another page of the cache block (step S38). Afterwards, when receiving an update command from a user, the first and second blocks are updated according to the first and second data stored in the cache block, as well as the related messages "the number of the first block, the number of the first page" and "the number of the second block, the number of the second page" (step S39).

In the above embodiment, a cache block is used for the update procedure of several blocks. Based on the principle of the invention, all blocks of a flash memory apparatus may be divided into a number of groups, each corresponding to a cache block, as discussed below.

Figure 4:
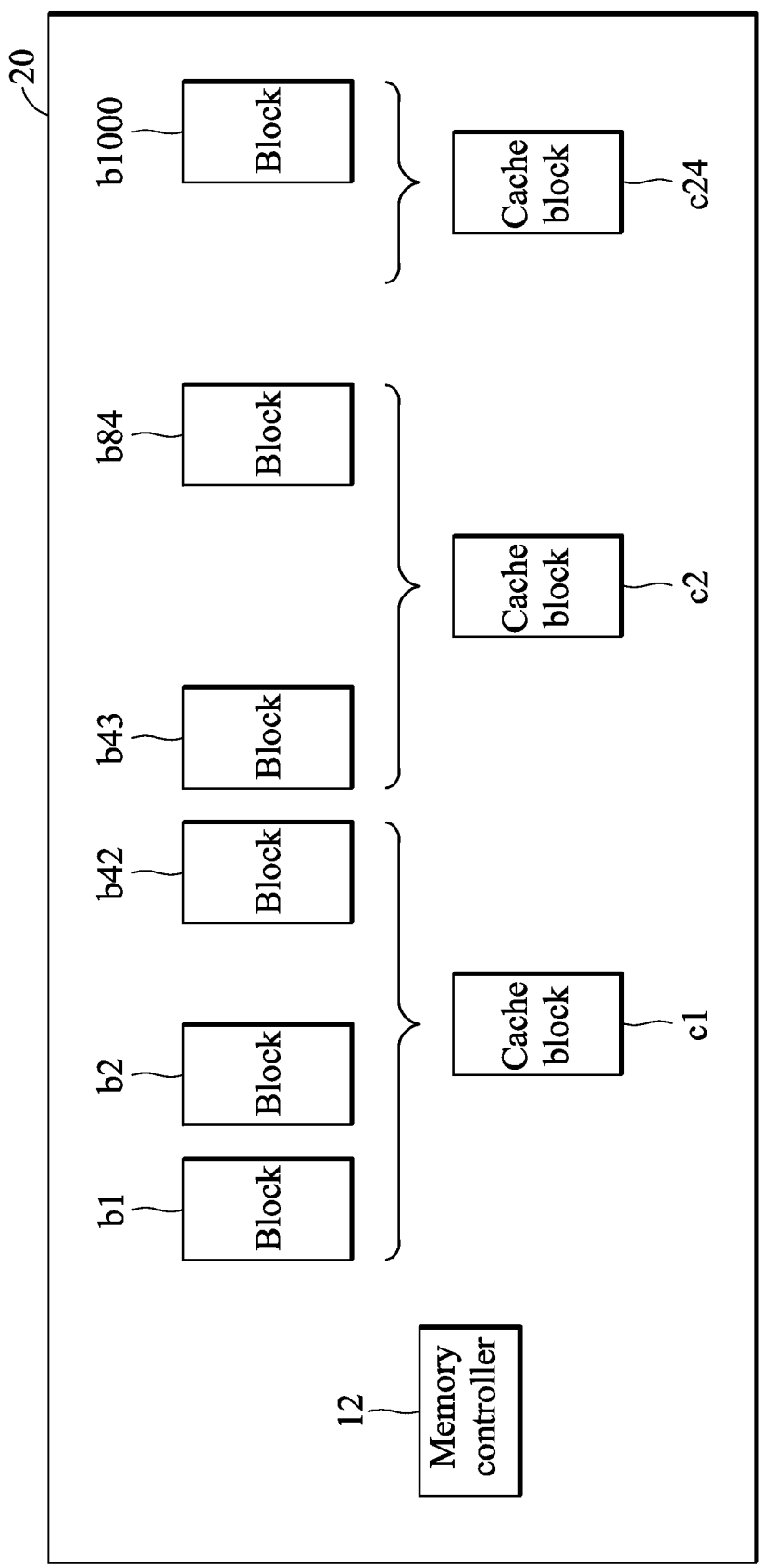
FIG. 4 shows a diagram of a flash memory apparatus according to another embodiment of the invention.

FIG. 4 shows a diagram of a flash memory apparatus according to another embodiment of the invention. In FIG. 4, the flash memory apparatus comprises M blocks numbered as b1, b2, ..., b(M-1) and bM. If M is 1024, the flash memory apparatus comprises 1024 blocks. Next, the memory controller 12 selects N out of the 1024 blocks as N cache blocks, numbered as c1, c2, ..., c(N-1) and cN. If N is 24, the number of the remaining blocks is M-N, which is 1000 in this embodiment. Based on this, the memory controller 12 may equally allocate the 1000 blocks to the 24 cache blocks, with each cache block approximately allocated with 42 blocks (1000/24≈42). As a result, a first group composed of blocks b1 to b42 is assigned to a cache block c1, and a second group composed of blocks b43 to b84 is assigned to a cache block c2 . . . etc.

Based on the groups, when the memory controller 12 receives a data to be written into a certain block within a group, a cache block corresponding to the group may be used. For example, if the memory controller 12 receives the data X, Y and Z to be respectively written into a page 3 of a block b2 within a first group, a page 1 of a block b5 within the first group, and a page 7 of a block b55 within a second group. In this case, only a cache block c1 is used to update the blocks b2 (for data X) and b5 (for data Y) since they are within the same group. The procedure regarding the update of the blocks b2 and b5 using the cache block c1 has been described above, so it's not described again for brevity. In addition, another cache block c2 is used to update the block b55 (for data Z). The cache block c2 is used because the block 55 where the data Z is to be directed to is not within the same group with blocks b2 and b5. Based on the principle of the invention, a corresponding cache block is used when a data is to be written into a block within different group. As such, by using less cache blocks (N cache blocks), the invention is able to manage all of the blocks in an efficient way.

In addition, in the above embodiment, the number of the blocks in the same group is consecutive (e.g. b1 to b42 in a row). However, in another embodiment, the number of the blocks in the same group may not necessarily be consecutive. For example, the number of the blocks in every 42 blocks may be grouped together, i.e. the blocks b1, b43, b85 and so on, may be formed as a group corresponding to a cache block cl. Similarly, the blocks b2, b44, b86 and so on, may also be formed as another group corresponding to a cache block c2 . . . etc. The grouping mechanism can avoid the situation where only few cache blocks are used when the blocks to be updated are centralized around a certain number. This optimizes the use of cache blocks by averagely using all the cache blocks.

In addition, in another embodiment, the blocks within the same group may also be randomly chosen. For example, with blocks b1 to b1000 and a first data is to be written into a block b3. In this case, a cache block c1 may be allocated as being corresponded to the block b3. Next, assume a second data is to be written into a block b300. In this case, another different cache block c2 may be allocated as being corresponded to the block b300 . . . etc. In this embodiment, therefore, a different cache block is allocated as being corresponded to a following block that requires update until the last cache block c24 is used. This time, assume a twenty-five data is to be written into a block b10, then any cache block from c1 to c24 may be randomly allocated as being corresponded to the block b10. With the random allocation, the grouping of the blocks may be based on the order of the blocks that occur to require update.

Figure 5:
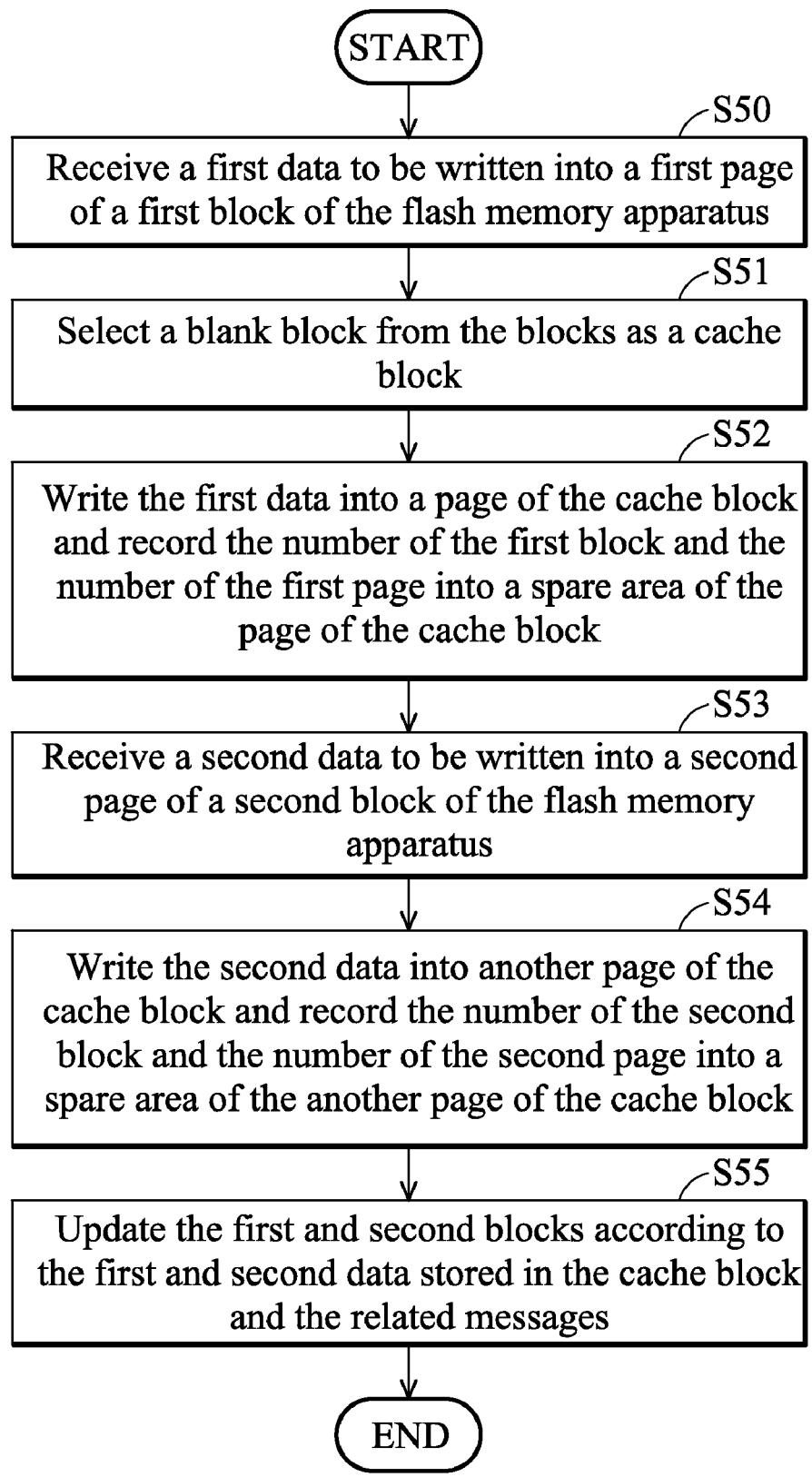
FIG. 5 shows another flowchart for data updating for a flash memory apparatus according to an embodiment of the invention.

In addition, in another embodiment, the steps S31, S33, S36 and S37 may be ignored, as shown in FIG. 5. In FIG. 5, in the beginning, a first data to be written into a first page of a first block of the flash memory apparatus is received (step S50). Next, a blank block is selected from the blocks as a cache block (step S51). Following, the first data is written into a page of the cache block, and the number of the first block and the number of the first page are recorded into a spare area of the page of the cache block (step S52). Next, a second data to be written into a second page of a second block of the flash memory apparatus is received (step S53). Next, the second data is written into another page of the cache block, and the number of the second block and the number of the second page are recorded into a spare area of the another page of the cache block (step S54). Afterwards, the first and second blocks are updated according to the first and second data stored in the cache block, as well as the related messages "the number of the first block, the number of the first page" and "the number of the second block, the number of the second page" (step S55).

Figure 6:
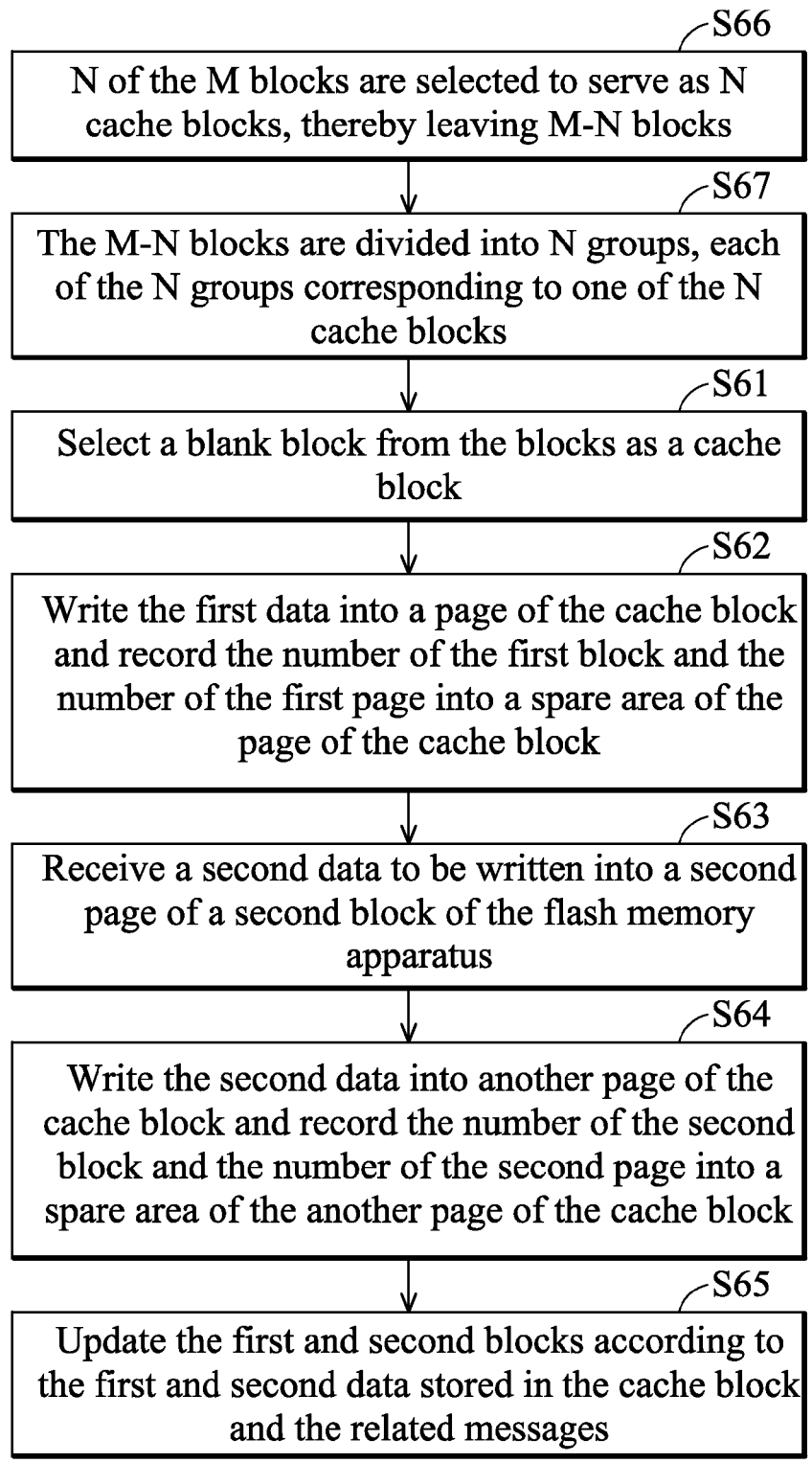
FIG. 6 shows a flowchart for data update procedure for a flash memory apparatus according to an embodiment of the invention.

FIG. 6 shows a flowchart for data update procedure for a flash memory apparatus according to an embodiment of the invention. The features of steps S61-S65 are the same as the features of steps S51-S55. The different is that N of the M blocks are selected to serve as N cache blocks, thereby leaving M-N blocks (step S66). The M-N blocks are divided into N groups, each of the N groups corresponding to one of the N cache blocks (step S67).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flash memory apparatus, comprising:
a plurality of blocks comprising a first block, wherein the first block comprises a first page; and
a memory controller receiving a first data to be written into the first page of the first block, and when the first page has already been written to, the memory controller further selects one of the blocks as a first cache block, writes the first data into a first cache page of the first cache block and records a number of the first block and a number of the first page into the first cache page, and when receiving an update command, the memory controller further updates the first block according to the number of the first block and the number of the first page recorded in the first cache page.

2. The flash memory apparatus as claimed in claim 1, wherein the memory controller further receives a second data to be written into a second page of a second block of the blocks, and writes the second data into a second cache page of the first cache block and records a number of the second block and a number of the second page into the second cache page when the second page has already been written to.

3. The flash memory apparatus as claimed in claim 2, wherein the memory controller further updates the second block according to the number of the second block and the number of the second page recorded in the second cache page when receiving the update command.

4. The flash memory apparatus as claimed in claim 1, wherein a number of the blocks is M and the memory controller further selects N out of the M blocks as N cache blocks, thereby leaving M-N blocks.

5. The flash memory apparatus as claimed in claim 4, wherein the memory controller further divides the M-N blocks into N groups, each of the N groups corresponding to one of the N cache blocks.

6. The flash memory apparatus as claimed in claim 5, wherein the memory controller further receives a second data to be written into a second page of a second block within one of the N groups, and writes the second data into a second cache page of a second cache block corresponding to the one of the N groups and records number of the second block and number of the second page into the second cache page when the second page has already been written to.

7. The flash memory apparatus as claimed in claim 6, wherein the memory controller further updates the second block according to the number of the second block and the number of the second page recorded in the second cache page, and the first block is within a group different from the second block.

8. A data update method for a flash memory apparatus comprising a plurality of blocks comprising a first block, wherein the first block comprises a first page, comprising:
receiving a first data to be written into the first page of the first block by a memory controller;
writing the first data into a first cache page of a first cache block when the first page has already been written to by the memory controller;
recording a number of the first block and a number of the first page into the first cache page by the memory controller; and
updating the first block according to the number of the first block and the number of the first page recorded in the first cache page by the memory controller when receiving an update command.

9. The data update method as claimed in claim 8, further comprising:
receiving a second data to be written into a second page of a second block of the blocks;
writing the second data into a second cache page of the first cache block when the second page has already been written to; and
recording a number of the second block and a number of the second page into the second cache page.

10. The data update method as claimed in claim 9, further comprising updating the second block according to the number of the second block and the number of the second page recorded in the second cache page when receiving the update command.

11. The data update method as claimed in claim 8, wherein number of the blocks is M and the method further comprises selecting N out of the M blocks as N cache blocks, thereby leaving M-N blocks.

12. The data update method as claimed in claim 11, further comprising dividing the M-N blocks into N groups, each of the N groups corresponding to one of the N cache blocks.

13. The data update method as claimed in claim 12, further comprising:
receiving a second data to be written into a second page of a second block within one of the N groups;
writing the second data into a second cache page of a second cache block corresponding to the one of the N groups when the second page has already been written to; and
recording number of the second block and number of the second page into the second cache page.

14. The data update method as claimed in claim 13, further comprising updating the second block according to the number of the second block and the number of the second page recorded in the second cache page when receiving the update command, wherein the first block is within a group different from the second block.

* * * * *